United States Patent
Stansbury et al.

(10) Patent No.: US 10,672,213 B2
(45) Date of Patent: Jun. 2, 2020

(54) CURRENCY SORTING MECHANISMS AND METHODS

(71) Applicants: John William Stansbury, Frederick, MD (US); Anthony Joseph Sheehi, Poolesville, MD (US); Colin Park, Poolesville, MD (US); Kevin Su, Boyds, MD (US); Kartik Sundareshwar Krishnan, North Potomac, MD (US); Marisa Natalia Casay, Gaithersburg, MD (US); Sahil Mayenkar, Boyds, MD (US); Wally Lai Niu, Germantown, MD (US); Raymond Cheng, Gathersburg, MD (US); Grace Ra Kim, Germantown, MD (US); Na Hye Kim, Germantown, MD (US); Kashif Rahman, Germantown, MD (US); Ritvik Pradeep Kumar Jain, Boyds, MD (US); Sreya Vangara, Germantown, MD (US); Jessica Yin, Silver Spring, MD (US); Grace Wen-Lian Tang, Gaithersburg, MD (US); Jessica Bhattacharyya, Germantown, MD (US)

(72) Inventors: John William Stansbury, Frederick, MD (US); Anthony Joseph Sheehi, Poolesville, MD (US); Colin Park, Poolesville, MD (US); Kevin Su, Boyds, MD (US); Kartik Sundareshwar Krishnan, North Potomac, MD (US); Marisa Natalia Casay, Gaithersburg, MD (US); Sahil Mayenkar, Boyds, MD (US); Wally Lai Niu, Germantown, MD (US); Raymond Cheng, Gathersburg, MD (US); Grace Ra Kim, Germantown, MD (US); Na Hye Kim, Germantown, MD (US); Kashif Rahman, Germantown, MD (US); Ritvik Pradeep Kumar Jain, Boyds, MD (US); Sreya Vangara, Germantown, MD (US); Jessica Yin, Silver Spring, MD (US); Grace Wen-Lian Tang, Gaithersburg, MD (US); Jessica Bhattacharyya, Germantown, MD (US)

(*) Notice: Subject to any disclaimer, the term of this patent is extended or adjusted under 35 U.S.C. 154(b) by 165 days.

(21) Appl. No.: 15/835,167

(22) Filed: Dec. 7, 2017

(65) Prior Publication Data

US 2019/0180548 A1    Jun. 13, 2019

(51) Int. Cl.
*G07D 11/50*   (2019.01)
*G10L 15/22*   (2006.01)
(Continued)

(52) U.S. Cl.
CPC ............ *G07D 11/50* (2019.01); *G06F 3/16* (2013.01); *G07D 7/12* (2013.01); *G07D 11/25* (2019.01);
(Continued)

(58) Field of Classification Search
CPC ......... B07C 5/34; B07C 5/342; B07C 5/3422; G07D 7/12; G07D 11/25; G07D 11/40;
(Continued)

(56) References Cited

U.S. PATENT DOCUMENTS

| 2006/0016884 A1* | 1/2006 | Block | G06K 19/08 235/381 |
| 2016/0125375 A1* | 5/2016 | Magee | G07F 19/201 705/43 |

* cited by examiner

*Primary Examiner* — Charles A Fox
*Assistant Examiner* — Kalyanavenkateshware Kumar (57) ABSTRACT

Currency note sorting devices and systems, and corresponding methods of identifying and sorting currency notes are (Continued)

described herein. A method for sorting currency notes that includes receiving currency notes, identifying the denomination of the currency notes, and distributing the currency notes to slots of a wallet based on the identified denomination. The wallet slots include staggered braille tabs to aid visual-impaired users of the wallet.

18 Claims, 7 Drawing Sheets (51) Int. Cl.
*G06F 3/16* (2006.01)
*G07D 7/12* (2016.01)
*G07D 11/25* (2019.01)
*G07D 11/40* (2019.01)
*G09B 21/00* (2006.01)

(52) U.S. Cl.
CPC .............. *G07D 11/40* (2019.01); *G10L 15/22* (2013.01); *G09B 21/003* (2013.01)

(58) Field of Classification Search
CPC ........ G07D 11/50; G07D 11/18; G10L 15/22; G06F 3/16; G09B 21/003
USPC ......... 235/279; 209/534; 194/206, 207, 344, 194/346
See application file for complete search history.

CURRENCY SORTING MECHANISMS AND METHODS

BRIEF DESCRIPTION OF THE DRAWINGS

For a more complete understanding of the disclosure, reference is made to the following detailed description and accompanying drawing figures, in which like reference numerals may be used to identify like elements in the figures.

While the disclosed devices, systems, and methods are representative of example implementations in various forms, specific implementation are illustrated in the drawings (and are hereafter described), with the understanding that the disclosure is intended to be illustrative, and is not intended to limit the claim scope to the specific implementations described and illustrated herein.

DETAILED DESCRIPTIONS

This disclosure generally relates to currency sorting mechanisms and methods of sorting currency notes by denomination into braille-lined wallet slots. More particularly, this disclosure generally relates to systems and methods for sorting currency to aid vision-impaired individuals. For example, the currency sorting mechanisms described herein may allow a vision-impaired individual to identify specific types of currency (e.g., $1 bill, $5 bill), sort the currency according to type, and place the sorted currency in a wallet (e.g., in slots specifically designated for each denomination of currency).

Figure 1:
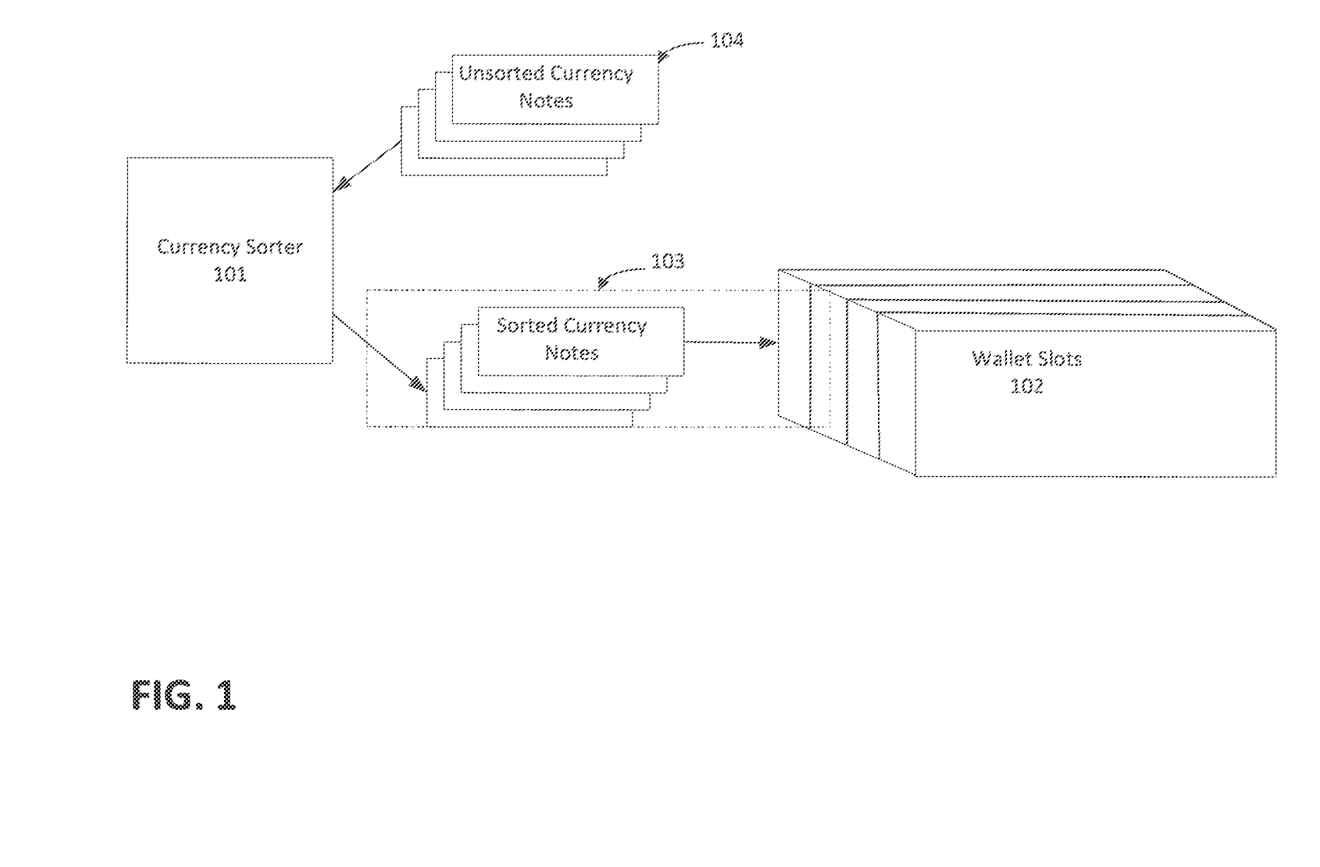
FIG. 1 depicts an overview environment include a currency sorter device.

FIG. 1 is an illustration of an environment 100 in an example implementation that is operable to employ the techniques described herein. The illustrated environment 100 includes an example currency sorter 101 that may be physically coupled to wallet currency slots 102 via a wallet sorter attachment 103. The environment 100 further includes unsorted currency notes 104 that may be fed into the currency sorter 101 for sorting into the wallet currency slots 102. The currency sorter 101 may be configured in a variety of ways. For example, the currency sorter 101 may be configured for mobile use or use in a fixed location. The currency sorter 101 may include a computing device with substantial memory and processor resources, or one or more low-resource devices with limited memory and processing resources. The currency sorter 101 may also include software that causes the computing device of the currency sorter 101 to perform one or more operations.

The currency sorter 101 may be physically coupled to the wallet currency slots 102 in a variety of ways. For example, the currency sorter 101 may be coupled to the wallet currency slots 102 via a wallet sorter attachment 103 that may be attached magnetically, mechanically, or via other detachable means. In this way, the wallet may be attached and detached from the currency sorter 101, allowing a user of the wallet to remove the wallet from the currency sorter 101 and carry the wallet on their person. In one implementation, the wallet may be specifically designed for use with the currency sorter 101 (and thus for use with the wallet sorter attachment 103). In another implementation, the wallet sorter attachment 103 may be designed such that a common or modified wallet may be used with the currency sorter 101.

Figure 2:
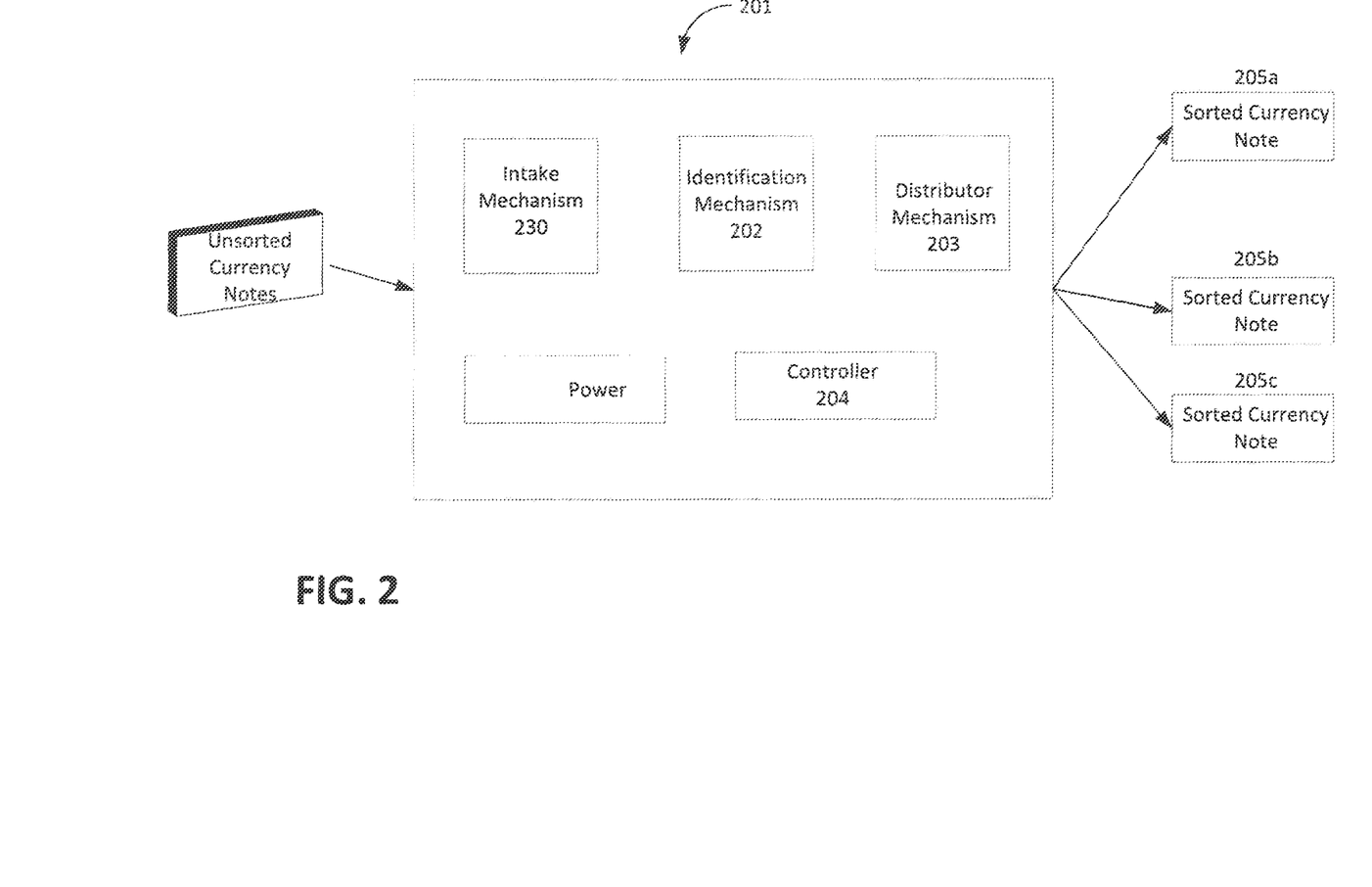
FIG. 2 depicts internal components and mechanisms of the currency sorter device of FIG. 1.

FIG. 2 illustrates an example implementation of a currency sorter 201. The currency sorter 201 of FIG. 2 may be one configuration of the currency sorter 101 of FIG. 1. The currency sorter 201 may include an intake mechanism 230, an identification mechanism 202, and a distributor mechanism 203. While the example implementation of FIG. 2 shows intake mechanism 230, identification mechanism 202, and a distributor mechanism 203 as one discrete mechanism, an implementation of the currency sorter 201 may be configured to include any combination of mechanisms necessary to provide the functionality disclosed. The currency sorter 201 may also include a controller 204 that may be electrically coupled to various components within the currency sorter 201. Controller 204 may range from full resource devices with substantial memory and processor resources, to a low-resource device with limited memory and/or processing resources. An example implementation of the controller 204 is discussed below with reference to FIG. 7.

The currency sorter 201 may receive a stack of unsorted currency notes 104 that are fed into the intake mechanism 230. The intake mechanism 230 separates the unsorted currency notes into individual currency notes that are fed into the identification mechanism 202. As will be appreciated, many different implementations of the intake mechanism 203 may be utilized (such as a rolling intake common to vending machines).

The identification mechanism 202 scans each currency note to determine the denomination of the currency note. The identification mechanism 202 then provides the currency note and additional information to the distributor mechanism 203. The additional information provided may be include the denomination of the currency note, an identification status of the currency note, an audio indicator, and other miscellaneous data. Using the information provided by the identification mechanism 202, the distributor mechanism 203 outputs each currency note to a slot of wallet slots 205 (e.g., slot 205a, slot 205b, slot 205c . . . slot 205n) corresponding to the identified denomination of the currency note. To the extent a currency note is unidentified, the unidentified currency note would be output to a wallet slot 205 designated for such notes.

In an example implementation, the number of currency notes in a particular slot of wallet slots 205 may exceed the size of the slot, which may cause jamming of the currency sorter 201. To avoid jamming, the currency sorter 201 maintains a record of the number of currency notes stored in each slot of wallet slots 205. If the number of currency notes stored in a slot of wallet slots 205 exceeds a threshold (such as, 25 currency notes per slot), the currency sorter 201 may stop placing additional currency notes in that slot (such as, by placing additional currency notes of that particular currency into an overflow slot for future scanning or outputting the excess currency notes to an external slot) and may send a notification of such overflow to a user (for example, the currency sorter 201 may output an audio signal indicating that the slot of wallet slots 205 for $1 bills is full and all $1 bills will be placed in the overflow slot for future sorting until the slot of wallet slots 205 for $1 bill has been emptied).

Figure 3:
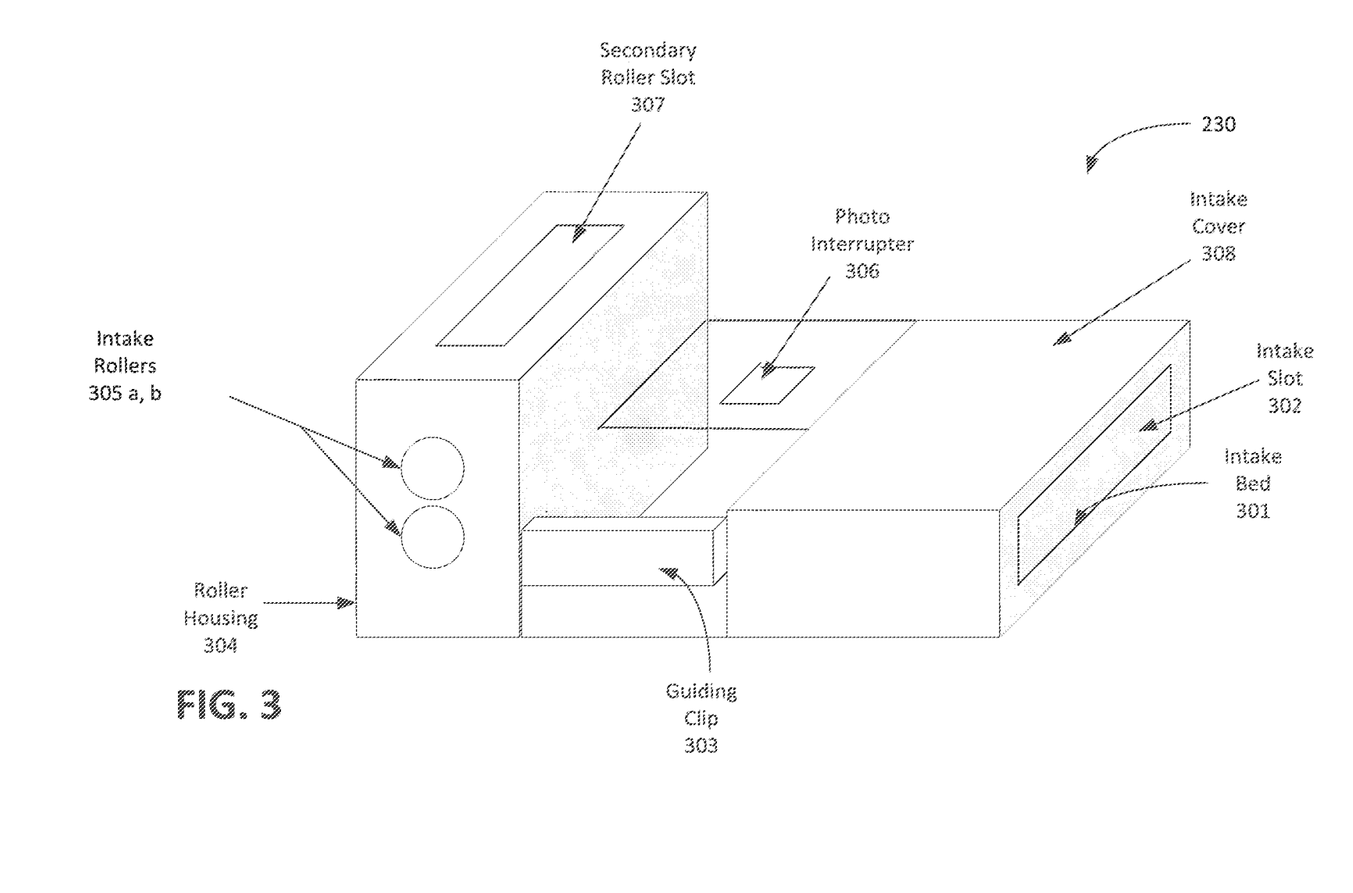
FIG. 3 depicts an isometric view of an intake mechanism of the currency sorter device of FIG. 1.

FIG. 3 illustrates an example implementation of the intake mechanism 230. Intake mechanism 230 may be implemented in a chassis 300. An example chassis 300 may include an intake plate 301, intake cover 308, a guiding clip 303, and a roller housing 304. The chassis further includes an intake slot 302 that is formed by an opening created between the intake cover 308 and the intake plate 301.

The intake plate 301 may include a photo interrupter slot 306, which enables the intake mechanism 230 to detect when a currency note is placed on the intake plate 301. In some implementations, the width of the intake slot 302 may have a width greater than 60.0 millimeters, or some width less than 90.0 millimeters. In one example, the width may be in a range of 65.0 millimeters to 86.0 millimeters. The intake slot 302 may further be configured to accommodate the width of the currency notes most commonly used by users of the currency sorter 201. For example, currency notes in the United States have different dimensions that currency notes in China or Europe. In one configuration, the intake slot 302 may be configurable such that a user can select a specific currency country and the intake slot 302 will adjust to match the common dimensions of currency from that country.

The guiding clip 303 is connected to the chassis 300 via a spring hinge. The spring hinge may be attached to the chassis 300 by screws or other fastening mechanisms, e.g., thermal adhesive, magnets. The guiding clip 303 may be configured to operate in multiple positions. For example, using the spring clip, the guiding clip 303 may operate in an open or closed position. In order to accept currency notes into the roller housing, the guiding clip 303 may operate in the open position. In the open position, the guiding clip allows the user to align the unsorted currency notes 104 with the roller housing. When the guiding clip 303 is transitioned to the closed position, the unsorted currency notes are properly aligned for processing by the rollers 305a and 305b. The operation of the guiding clip 303 may be controlled manually or automatically. For example, the guiding clip 303 may be automatically transitioned from an open position to a closed position by way of a servomechanism ("servo") configured to control a pivot point on the spring hinge. The servo in the intake mechanism may be electrically coupled to a system controller and power source housed within the currency sorter 101.

The roller housing includes intake rollers 305a and 305b. The intake rollers 305a and 305b rotate within the roller housing 304 to separate a stack of currency notes into single notes for identification. Intake rollers 305a and 305b are configured to prevent faulty intake of unsorted currency notes where a currency not is not accepted in its entirety for identification. The intake rollers 305a and 305b are set in a parallel configuration with a gap between the rollers sufficient for a single note to pass through. The roller housing may also include a secondary roller 307. The secondary roller 307 may be positioned above the intake rollers 305a and 305b to grab the first currency note in a stack of unsorted currency notes 104 to feed into the intake rollers 305a and 305b. Intake rollers 305a and 305a may be configured to rotate in the same direction or in opposing directions to ensure that only one currency note passes through the intake rollers 305a and 305b. For example, the intake rollers 305a and 305b may be configured to prevent any additional notes from flowing through by providing a constant opposing torque force that pushes any excess notes back into the stack of unsorted currency notes 104. The rollers 305a, 305b, and 307 may be electrically coupled to a system controller and a power source housed within the currency sorter 101 to activate rotation of the rollers.

Figure 4:
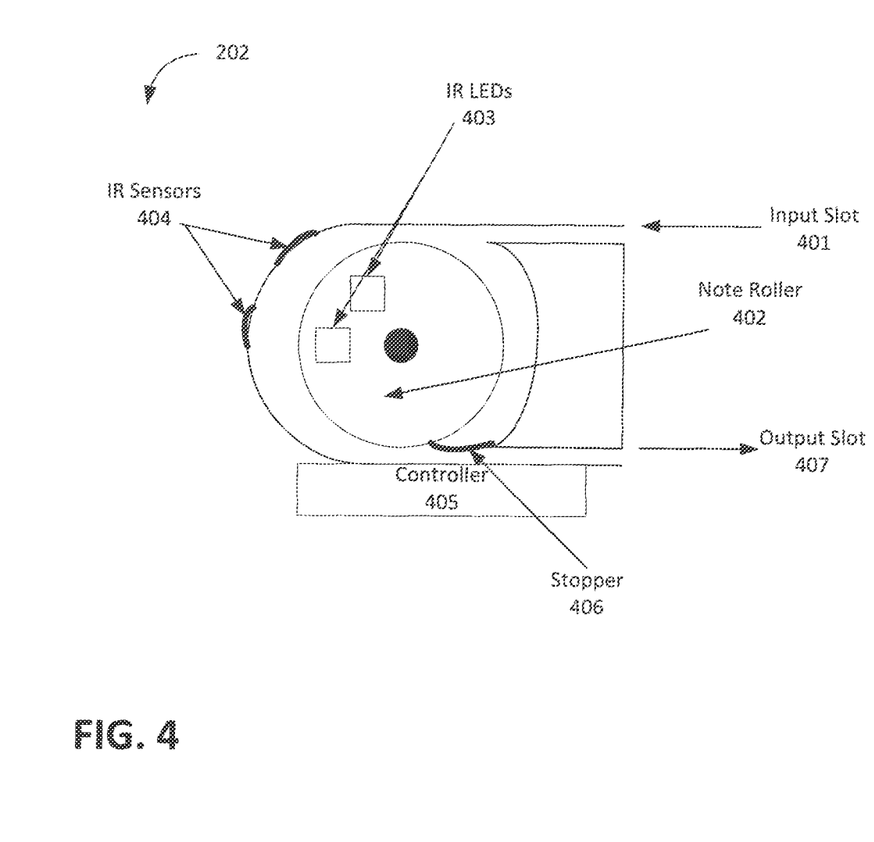
FIG. 4 depicts a cutaway sideview of an identification mechanism of the currency sorer device of FIG. 1.

FIG. 4 illustrates an example implementation of the identification mechanism 202. The identification mechanism includes an input slot 401, note roller 402, infrared light emitting diodes ("IR LEDs") 403, infrared sensors ("IR sensors") 404, controller unit 405, stopper 406, and output slot 407. The input slot 401 receives a single unsorted currency note from the input mechanism 201. The note is pulled through the identification mechanism 202 by the note roller 402 and pushed through the output slot 407 for distribution.

The note roller 402 may include one or more cylinders that are coaxial and placed next to each other. For example, the note roller 402 may be configured to include three cylinders of equal diameter and length. In this configuration, the collective width of the cylinders may be greater than or equal to the width of the currency note. The circumference of each cylinder may be less than, greater than, or equal to the length of the currency note. The outside cylinders may be configured to be stationary. The center cylinder may be configured to have a tactile outer surface and rotate. As such, the rotation of the center cylinder will serve to pull the currency note through the identification mechanism 202. In another example, the note roller 402 may include a single cylinder with a tactile outer surface. The width of the cylinder may be configured to be greater than, less than, or equal to the width of the currency note.

In an example implementation, the IR LEDs 403 may be configured to reside within the cylinders and illuminate the currency note as it passes through the identification mechanism 202. The IR sensors 404 may be positioned outside of the cylinders and on an opposing side of the currency note as the note passes through the identification mechanism 202. In an example, the currency note will move between pairs of IR LEDs 403 and IR sensors 404. The IR LEDs 403 and IR sensors 404 are configured to detect the size and spacing between, for example, IR reactive strips that may be embedded within each currency note. For example, in US currency notes, the IR reactive strips, or other detectable information, are spaced apart to uniquely identify the denomination of each currency note.

If the denomination of the currency note cannot be identified, the stopper 406 closes the output slot 407 and routes the currency note for one or more passes through the identification mechanism 202. After identification of the currency note denomination the currency note is pushed out through the output slot 407. In addition, other identification data is forwarded by the controller 405 to the distribution mechanism. If the denomination of the currency note still cannot be identified, the identification mechanism may place the currency note in an unidentified currency slot. Unidentified currency in the unidentified currency slot may need to be visually inspected by a human to determine the validity and denomination of the currency note.

Control 405 may be electrically coupled to the motor that controls the rotation of the note roller 402, the IR LEDs 403, the IR sensors 404, the stopper 406, and the distributor mechanism 203. Controller 405 may be configured to provide functionality similar to that required by controller 204 (FIG. 2) and as such may be implemented in a single computing device to control all operations of the currency sorter 201. Alternatively, controllers 204 and 405 may be discrete computing devices that are tailored to perform very specific functions. An example implementation of the controller 405 is further discussed below with reference to FIG. 7.

Figure 5:
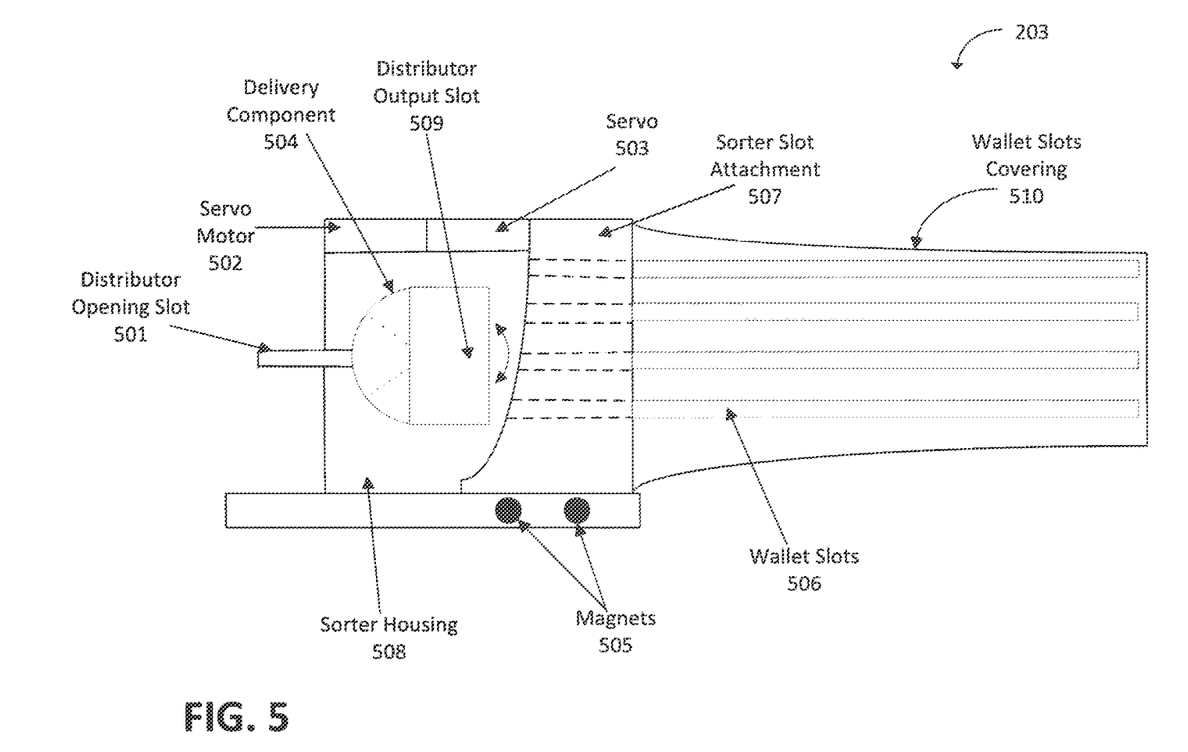
FIG. 5 depicts a cutaway sideview of a distributor mechanism of the currency sorter device of FIG. 1.

FIG. 5 illustrates an example implementation of the distributor mechanism 203. The distributor mechanism 203 receives a currency note from the identification mechanism 202 via distributor opening slot 501. The distributor opening slot 501 is aligned with the output slot 407 of the identification mechanism 202. The received currency note is passed from the opening slot 501 to a delivery component 504. The delivery component 504 is controlled by a servo motor 502 and servo arm 503 to divert the delivery component 504 to the appropriate destination slot based on the information received from the controller 405. The distributor mechanism 203 may also include a sorter slot attachment 507 that connects the currency sorter 201 to wallet slots 506. For ease of detachment, the sorter slot attachment 507 may be connected to the currency sorter 201 magnetically, mechanically, or by other detachable means. The opening slot 501, servo motor 502, servo arm 503, delivery component 504, magnets 505, and sorter slot attachment 507 may be enclosed within a sorter housing 508.

The delivery component 504 may be extruded to be rounded on one side and flat on the other side as shown in FIG. 5. The shape of delivery component 504 ensures the smooth rotation of the component for delivery of the currency note to one of the wallet slots 506. The delivery component is coupled to servo motor 502 and servo arm 503. In one implementation, the servo arm 503 has a length that ranges between 10 millimeters and 15 millimeters. The delivery component 504 may have a wide opening on the rounded side to allow for rotation of the delivery component 504 to align the distributor output slot 509 with openings of the sorter slot attachment 507. The delivery component 504 may be rotated in a range between 0 degrees and 120 degrees to align the distributor output slot 509 with any of the openings in the sorter slot attachment 507. The delivery component 504 may also include a small rubber roller within the delivery component 504 to facilitate movement of the currency note from the distributor opening slot 501 through the distributor output slot 509 to the openings in the sorter slot attachment 507.

In an implementation, the sorter slot attachment 507 includes multiple slots for receiving a currency note from distributor output slot 509 of the delivery component 504 and directing the currency note to a slot of the wallet slots 506 that corresponds to an identified denomination. The slots of the sorter slot attachment 507 correspond to denomination of identified currency notes and unidentified currency notes. For example, opening 507a may correspond to $1 note; opening 507b may correspond to a $5 note; opening 507n may correspond to unidentified currency note; or any combination thereof.

Wallet slots 506, in an example implementation, may be shaped like an accordion-like file folder. The wallet slots 506 may be configured to have rectangular shape in order to fit within a standard wallet and to conform to the shape of most currency notes. The wallet slots 506 are attached to the sorter slot attachment 507 to receive currency notes fed into openings in the sorter slot attachment 507. In an implementation, the short side of the wallet slots 506 are attached to the sorter slot attachment 507. The accordion-like implementation of the wallet slots 506 allows the wallet slots to collapse and fold when detached from the currency sorter 201. To aid visual-impaired users of the currency sorter 201, the long side of wallet slots 506 may also include staggered tabs with braille writing that corresponds to the denomination of the sorted currency notes and the unidentified currency notes. In another example, the wallet slots 506 may be collectively enclosed within a wallet slots covering 510 that is made of any suitable material (e.g., leather, plastic, fabric) for protecting the wallet slots 506.

In another example implementation, the currency sorter 201 may include a temporary storage 550 (not shown in FIG. 5) that is separate and apart from the wallet slots 506. The temporary storage 550 may serve as an alternative to the wallet slots 506 for storing currency notes. The temporary storage 550 may include one or more slots for storing currency notes based on the denomination of the currency notes. The temporary storage 550 may be for used for storing sorted currency notes even when the wallet slots 506 is not attached to the currency sorter 201. For example, a visually-impaired user may want to use the currency sorter 201 to store high-denomination currency notes (e.g., higher than or equal to 50-dollar bills) and place low-denomination currency notes (e.g., lower than or equal to 20 dollar bills) in a wallet.

In an example configuration, the temporary storage 550 may be coupled to the intake mechanism to allow for scanning and identifying the currency notes in the temporary storage 550. For example, the currency notes in the temporary storage area 550 may be sorted or unsorted. Where the currency is unsorted, the user of the currency sorter 201 may attach wallet slots 506 for identifying and sorting the unsorted currency notes held in the temporary storage area 550. Even if the currency notes in the temporary storage 550 are already sorted, the user of the currency sorter 201 may attach wallet slots 506 and only wish to have some portion of the currency notes in the temporary storage area 550 transferred to wallet slots 506.

In an example implementation, the currency sorter 201 may be configured to output a maximum amount of sorted currency notes for transfer to the wallet slots 506. The currency sorter 201 may prompt the user to specify the user's desired amount of currency via voice command, braille keypads, or other mechanisms. Any amount greater than the user specified maximum may be stored in the temporary storage 550. For example, a user of the currency sorter may wish to carry less money in the wallet when going to purchase groceries, but wish to carry more money in the wallet when going to purchase furniture. Depending on the circumstances, the currency sorter may be configured to sort and store some currency notes, transfer currency notes to wallet slots, or any combination thereof.

At a certain time (such as, when one or more of the wallet slots 506 are full or when no additional currency needs to be sorted), the currency sorter 201 may provide a notification to a user that all currency notes in the wallet slots 506 are ready to be transferred to a wallet. In one implementation, a user may be prompted to detach the wallet slots 506 when all unsorted currency notes 104 fed into the intake mechanism 230 has been identified and sorted. In another example implementation, after a certain delay, the currency sorter 201 may provide an audio notification to the user (e.g., notifying the user of denominations identified or announcing the total value of currency notes identified).

Figure 6:
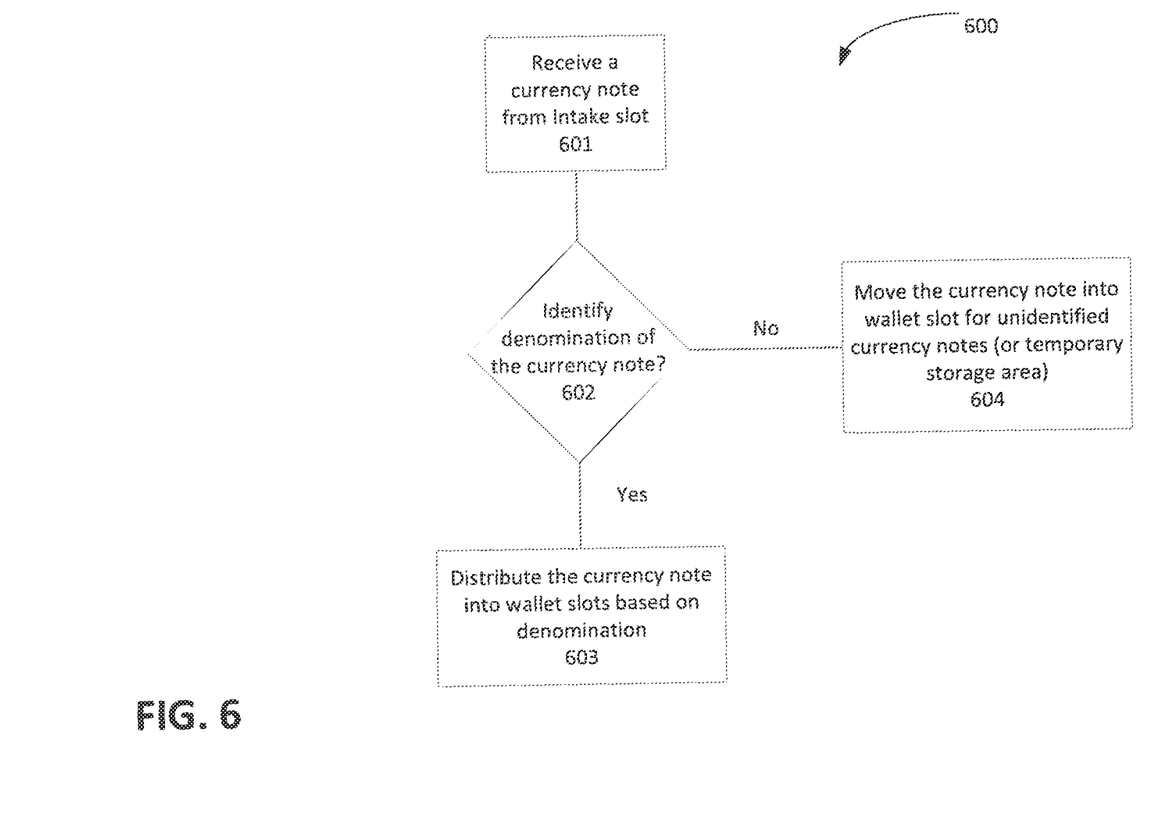
FIG. 6 depicts a flow diagram of a method for sorting currency notes in accordance with one example.

FIG. 6 show a flowchart of one example of a method 600 for using a currency sorter 101 to sort currency notes and place the sorted currency notes into specific slots in a wallet. The currency sorter 101 may include the mechanisms and controller devices described with reference to FIGS. 1-5 and/or FIG. 7. The method 600 is implemented in the order shown, but other orders may be used. Additional, different, or fewer acts may be provided.

In act 601, the currency sorter 101 receives a stack of one or more unsorted currency notes. The stack of currency notes may include currency notes oriented in any order along the x-axis on the intake surface of the currency sorter 101. For example, some of the currency notes could be inserted facing down, while other notes in the stack are facing up. The currency notes do not have to be arranged according to denomination. The currency notes are accepted into the currency sorter 101 for identification one note at a time. In an example implementation, the currency sorter 101 may also receive a stack of currency notes from a temporary storage area within the currency sorter 101.

In act 602, one or more IR LEDs light up each currency note picked up by the currency sorter 101 and one or more IR sensors scan the currency note to identify IR reactive strips in the currency note. For example, the IR sensors may be used to detect the distance between the IR reactive strips in a currency note. The detected distance between the IR reactive strips may be used by the controller of the currency sorter 101 to determine the denomination of the note. If the controller is able to determine the denomination of the currency note, the currency note is either placed in a temporary storage area or placed directly into a slot of wallet slots attached to the currency sorter 101. The currency note is tagged with the identified denomination along with other information that is passed on the distribution unit. If the controller is unable to positively identify the denomination of the currency note on a first pass, the currency note is passed through the identification process one or more additional times. If the currency note has exceeded a certain threshold of passes without positive identification, the currency note may be tagged as unidentified and placed in an unidentified currency slot of the wallet slots or in a temporary storage area of the currency sorter 101.

In act 603, if the received currency note is tagged as identified, the identified denomination is used to determine the appropriate slot for the currency note in the plurality of wallet slots. The denomination information is used by the controller to position and align the currency note with a slot in the wallet attachment for delivery into a wallet slot. In an implementation, the currency sorter 101 may provide an audio signal indicating completion of delivery of the currency note into the wallet slots. In another implementation, the currency sorter may provide an audio signal that corresponds to certain denominations to aid the user in counting the value of the identified currency notes. In yet another example, the currency sorter may provide a haptic response to completion of the identification and delivery process of one or more currency notes. In another example, the currency sorter 101 may prompt the user for information, such as maximum amount each denomination to transfer to the wallet slots, or the total value of currency to transfer to the wallet slots.

In act 604, if the currency note has passed through the identification process without positive identification of the denomination of the currency note. The information provided by the identification process is used by the controller to position and align the currency note with a slot in the sorter slot attachment for delivery into a wallet slot designated for unidentified currency notes. In an implementation, the currency sorter 101 may provide an audio signal indicating completion of delivery of the currency note into its designated wallet slot. In another implementation, the currency sorter 101 may provide an audio signal that informs the user about the unidentified currency note. In yet another example, the currency sorter 101 may provide a haptic response to completion of the identification and delivery process of one or more currency notes.

The examples of the method described with reference to FIG. 6 may provide optimal identification of unsorted currency notes and delivery of sorted currency notes into denomination-based wallet slots for a vision-impaired user. Alternatively, the examples of the method described may be used to sort and store unsorted currency notes into a temporary storage area.

Figure 7:
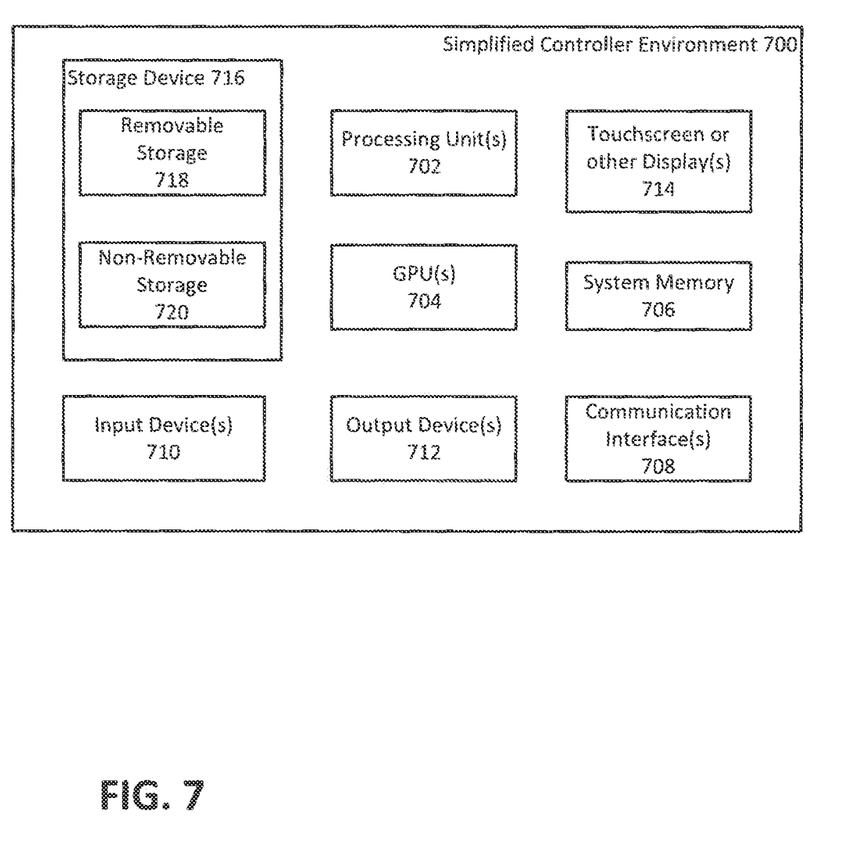
FIG. 7 is a block diagram of a computing environment in accordance with one example for implementation of the disclosed methods or one or more currency sorter devices.

With reference to FIG. 7, a currency sorter 101, as described above, may have some or all of its controlling functionality incorporated within an exemplary controller environment 700. The controller environment 700 has sufficient computational capability and system memory to enable basic computational operations. In this example, the controller environment 700 includes one or more processing units 702, which may be individually or collectively referred to herein as a processor. The controller environment 700 may also include one or more graphics processing units (GPUs) 704. The processor 702 and/or the GPU 704 may include integrated memory and/or be in communication with system memory 706. The processor 702 and/or the GPU 704 may be a specialized microprocessor, such as a digital signal processor (DSP), a very long instruction word (VLIW) processor, or other microcontroller, or may be a general purpose central processing unit (CPU) having one or more processing cores. The processor 702, the GPU 704, the system memory 706, and/or any other components of the controller environment 700 may be packaged or otherwise integrated as a system on a chip (SoC), application-specific integrated circuit (ASIC), or other integrated circuit or system.

The controller environment 700 may also include other components, such as, for example, a communications interface 708. One or more computer input devices 710 (e.g., pointing devices, keyboards, audio input devices, video input devices, haptic input devices, or devices for receiving wired or wireless data transmissions) may be provided. The input devices 710 may include one or more touch-sensitive surfaces, such as track pads. Various output devices 712, including touchscreen or touch-sensitive display(s) 714, may also be provided. The output devices 712 may include a variety of different audio output devices, video output devices, and/or devices for transmitting wired or wireless data transmissions.

The controller environment 700 may also include a variety of computer readable storage media for storage of information such as computer-readable or computer-executable instructions, data structures, program modules, or other data. Computer readable storage media may be any available media accessible via storage devices 716 and includes both volatile and nonvolatile media, whether in removable storage 718 and/or non-removable storage 720.

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the controller environment 700, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

While the present claim scope has been described with reference to specific examples, which are intended to be illustrative only and not to be limiting of the claim scope, it will be apparent to those of ordinary skill in the art that changes, additions and/or deletions may be made to the disclosed embodiments without departing from the spirit and scope of the claims.

The foregoing description is given for clearness of understanding only, and no unnecessary limitations should be understood therefrom, as modifications within the scope of the claims may be apparent to those having ordinary skill in the art.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A portable currency sorter comprising:
   an intake receiver configured to receive a plurality of currency notes, the intake receiver having an opening with an adjustable width;
   a currency identifier coupled to the intake receiver and configured to identify a denomination of a currency note; and
   a currency distributor comprising a first end and a second end, the first end coupled to the currency identifier and the second end coupled to a plurality of wallet slots, wherein the currency distributor is configured to rotate and output the identified currency note to one of the plurality of wallet slots based on the denomination of the currency note.

2. The portable currency sorter of claim 1, further comprising a temporary storage area coupled to the second end of the distributor.

3. The portable currency sorter of claim 2, wherein the temporary storage area includes one or more slots configured to receive currency notes based on the denomination of the currency notes.

4. The portable currency sorter of claim 2, wherein the distributor outputs currency notes exceeding a maximum denomination value to the temporary storage area.

5. The portable currency sorter of claim 2, wherein the intake receiver is configured to receive a selection of country information to determine width of the opening.

6. The portable currency sorter of claim 1, wherein the distributor is configured to output a maximum amount of each identified currency note to a wallet slot corresponding to the denomination of the currency note and output currency notes exceeding the maximum amount to a temporary storage area.

7. The portable currency sorter of claim 1, further comprising a sorter slot attachment, wherein the sorter slot attachment attaches to the second end of the distributor.

8. The portable currency sorter of claim 1, further comprising:
   an IR LED configured to illuminate the currency note passing through the currency identifier;
   an IR sensor configured to detect IR reactive strips in the currency note; and
   a processor electrically coupled to the IR LED and IR Sensor,
   wherein the processor is configured to:
      determine a distance between IR reactive strips in the currency note;
      determine the denomination of the currency note based on the distance; and
      provide an indication of the denomination.

9. The portable currency sorter of claim 8, wherein the processor is further configured to receive voice commands to configure a maximum value for identified currency notes.

10. The portable currency sorter of claim 9, wherein the processor is further configured to output an audio notification describing the currency notes output to the plurality of wallet slots.

11. The portable currency sorter of claim 8, wherein the processor is further configured to:
   compare the denomination to a maximum value; and
   output the identified currency note to a temporary storage area if the denomination exceeds the maximum value.

12. The portable currency sorter of claim 1, wherein the currency identifier is further configured to scan the currency note one or more additional times.

13. The portable currency sorter-of claim 1, wherein the plurality of wallet slots comprises tactile markings.

14. A portable currency sorter system comprising:
   a wallet attachment coupled to a currency sorter;
   the wallet attachment having a first end and a second end;
   a plurality of wallet slots configured with openings on a short side and a long side of each slot, each slot being designated for a currency denomination, wherein the slots are coupled to the second end of the wallet attachment; and
   the currency sorter configured to detachably couple to the first end of the wallet attachment, wherein the currency sorter comprises:
      an intake receiver configured to receive one or more currency notes;
      a scanner configured to identify a denomination of a currency note received by the intake receiver; and
      a distributor coupled to the scanner and configured to output the currency note to a designated wallet slot based on the denomination of the currency note.

15. A method for identifying and sorting currency notes into a wallet, the method comprising:
   configuring an opening of an intake slot of a currency sorter to a specified adjustable width;
   receiving one or more currency notes into the intake slot of the currency sorter;

selecting a currency note from the intake slot for identification;

identifying a denomination of the selected currency note;

communicating the identified denomination of the selected currency note to a delivery roller within the currency sorter; and inserting the selected currency note into one of a plurality of designated wallet slots based on the identified denomination, wherein the plurality of designated wallet slots comprises tactile markings.

16. The method of claim 15, wherein identifying a denomination of the selected currency note comprises:

comparing the denomination of the selected currency note to a threshold value; and storing the selected currency note in a temporary storage if the denomination is greater than the threshold value.

17. The method of claim 15, wherein selecting a currency note from the intake slot comprises prompting for a maximum number of currency notes to sort.

18. The method of claim 15 further comprises receiving country information to determine the width of the opening of the intake slot.

\* \* \* \* \*